Nov. 16, 1948.  H. M. RUSTEBAKKE ET AL  2,454,211
REGULATING SYSTEM
Filed Nov. 29, 1945
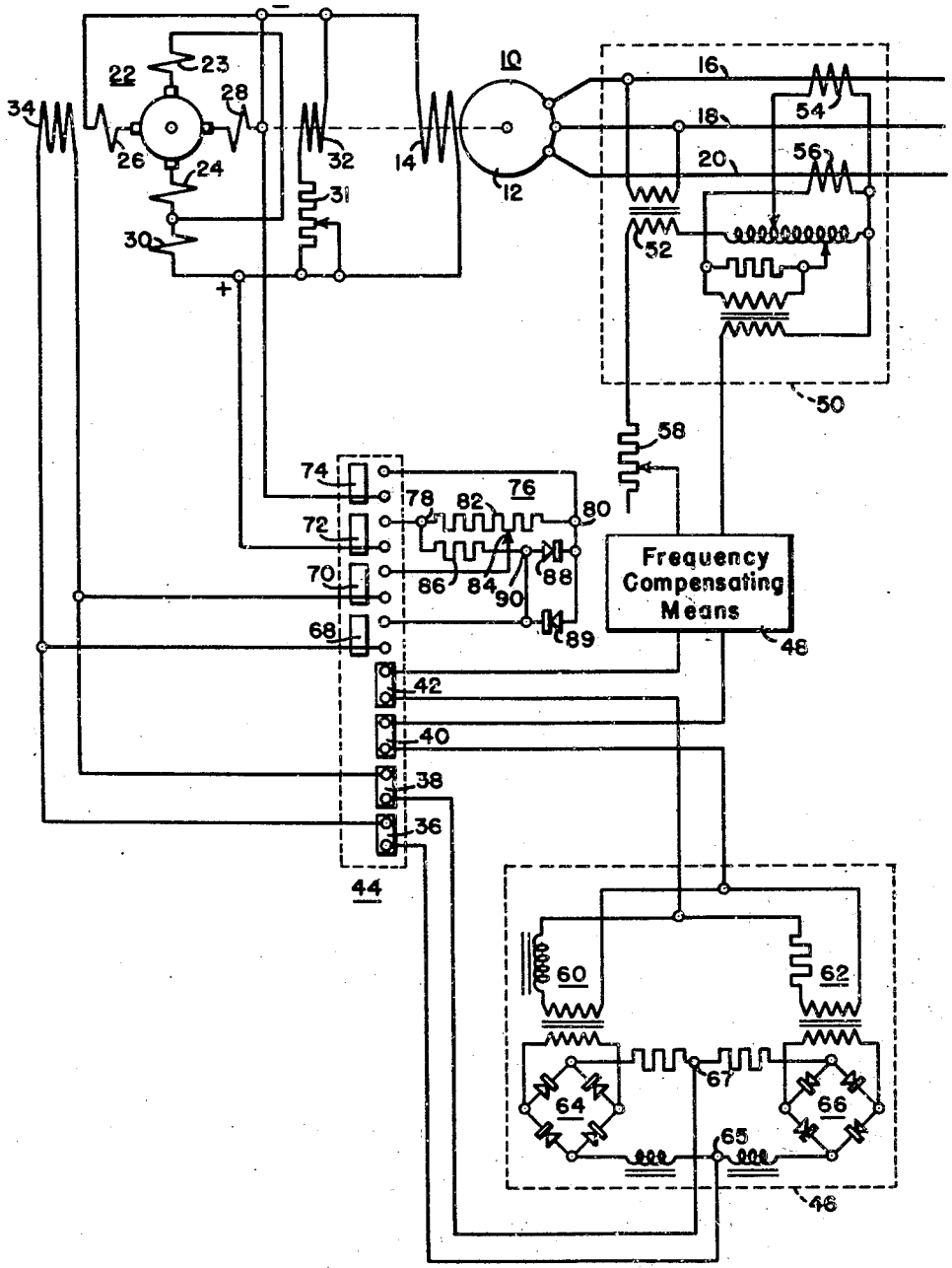
INVENTORS
Homer M. Rustebakke and
Albert W. Kimball.
BY
James N. Ely
ATTORNEY Patented Nov. 16, 1948

2,454,211

UNITED STATES PATENT OFFICE 2,454,211

REGULATING SYSTEM

Homer M. Rustebakke and Albert W. Kimball, Wilkinsburg, Pa., assignors to Westinghouse Electric Corporation, East Pittsburgh, Pa., a corporation of Pennsylvania Application November 29, 1945, Serial No. 631,724

4 Claims. (Cl. 322—77)

This invention relates to regulating systems.

Regulating systems which utilize conventional exciters for controlling the excitation of generators have been known for many years. The conventional exciters are designed to have a saturation curve such that saturation starts at a point below the lowest normal operating point on the curve in order to permit a stable manual control of the exciter. This is readily accomplished, for with a hand controlled rheostat adjusted in a predetermined manner and connected in the field circuit of the exciter, it is found that the resultant field circuit resistance line provides a definite intersection at a point along the exciter saturation curve and that the exciter voltage is at a value corresponding to the point of intersection. Such manual control is stable in that if the voltage of the exciter tends to rise, the increase is insufficient to produce enough field current to sustain the higher value, whereas if the voltage tends to decrease, the field current of the exciter is excessive and functions to restore the voltage to a value corresponding to the point of intersection referred to hereinbefore.

Recently there has been developed a self-excited or "series tuned" exciter which normally operates along the linear part of its saturation curve. Such exciters have a series field winding for normally supplying the majority of the excitation requirements with a shunt field for supplying the remainder of the excitation of the machine and at least one control field winding disposed to be directionally energized in response to the operation of a generator, the excitation of which is controlled by the exciter. As the self-excited exciter operates on the linear part of its saturation curve, it cannot be successfully manually controlled by a rheostat in series with a shunt field but instead, if such a manual control is utilized, it is found to be extremely unstable. This becomes evident when it is considered that the field circuit resistance line for the self-excited exciter coincides with the air gap line of the exciter throughout the linear part of the saturation curve, and that the same rheostat setting is required for all voltages from zero up to the saturation point. Thus, as the voltage of the exciter tends to change, the field current changes just the right amount to support the changed voltage and there is no tendency to apply a restoring force to correct the change in voltage.

In certain industrial applications, the generator whose excitation is controlled by the self-excited exciter sometimes slips a pole when the polarity of the exciter becomes reversed. Where the exciter is normally controlled by a regulator which is automatically responsive to changes in the voltage of the generator, it is essential that the manual control referred to hereinbefore be so disposed as to be utilized instead of the automatic regulator, as disclosed and claimed in copending application Serial No. 631,726, filed November 29, 1945, in the names of E. L. Harder and C. E. Valentine. While the manual control circuit embodying the rectifier as disclosed therein is satisfactory for normal operating conditions, it is found that where the polarity of the exciter becomes reversed, the manual control of the Harder et al. application is incapable of satisfactorily controlling the excitation of the generator.

An object of this invention is to provide, in a regulating system which utilizes a self-excited exciter for controlling the excitation of a generator, for a manual control of the system while retaining the operating characteristics of the exciter.

Another object of this invention is to provide in a regulating system for controlling the excitation of the generator for utilizing a self-excited exciter controlled by an interchangeable automatic and manual control, the manual control being operative under reverse polarity conditions of the exciter to control the operation of the exciter and thereby maintain the excitation of the generator.

A further object of this invention is to provide in a regulating system which utilizes a self-excited exciter for controlling the excitation of a generator, for a manual control responsive to the output of the exciter and operative under reverse polarity conditions of the exciter to control the operation of the exciter.

Other objects of this invention will become apparent from the following description when taken in conjunction with the accompanying drawing in which the single figure is a diagrammatic representation of a regulating system embodying the teachings of this invention.

Referring to the drawing, there is illustrated a generator 10, the voltage of which is to be regulated. The generator 10 comprises the armature windings 12 and the field windings 14, the armature windings 12 being connected for supplying a three-phase load circuit represented by conductors 16, 18 and 20. The field windings 14 are connected to be supplied from a rotary direct-current generator or self-excited exciter 22.

The self-excited exciter 22 schematically represented is of 4-pole construction having a plurality of field windings and is of the general construction and type disclosed and claimed in the copending application, Serial No. 607,440, filed July 27, 1945, in the names of W. R. Harding and A. W. Kimball, and assigned to the assignee of this invention. As disclosed therein, the exciter or rotary direct-current generator 22 has a number of pole pieces and an equal number of commutator brushes arranged to assume sequentially positive and negative electrical potentials. In the embodiment schematically shown in the drawing, the positive brushes of the 4-pole machine are interconnected by an equalizing connection as are also the negative brushes of the machine.

The exciter generator 22 is provided with forcing fields 23 and 24 connected in series circuit relation in one of the equalizing connections, the fields 23 and 24 being so divided as to constitute two groups of four windings each, a corresponding winding from each group being arranged on each of the four poles to be equally and sequentially excited by current flowing between the brushes. In addition to the forcing fields 23 and 24, the exciter generator 22 is also provided with compensating windings 26 and 28 disposed on two of the poles and self-sustaining or exciting field windings 30 and 32 which are so divided and positioned on all of the poles that the flux distribution of the self-excitation is symmetrical.

The field windings 30 are connected in series in the load circuit, whereas the field windings 32 are connected in shunt across the load circuit for the exciter generator 22, a calibrating resistance 31 being connected in series with the shunt fields. The series and shunt field windings of the exciter generator 22 may be cumulative with the series field windings 30 providing slightly less than required sustaining field strength and the shunt field 32 being only strong enough for adjusting to full self-excitation field strength to compensate for manufacturing differences and installation adjustment or the like. On the other hand, the shunt field windings 32 may be wound to oppose the series field windings 30 where the windings 30 supply slightly more than required sustaining field strength.

The series tuned exciter generator 22 is also provided with a control field winding 34 so wound as to provide equal windings on two of the poles to increase the strength of one while decreasing the strength of the other when energized, to distort the flux distribution in the field structure in a degree depending upon the energization of the control field winding. By utilizing the control field winding 34 in the exciter generator 22, the plurality of field windings cooperate in the single machine, as disclosed in the Harding et al. application Serial No. 607,440, identified hereinbefore, to give an extremely sensitive and quick response of generated voltage to changes of a comparatively weak input voltage while at the same time giving a high amplification ratio.

The control field winding 34 which is disposed to be normally deenergized when the generator 10 is operating to maintain a predetermined line voltage and to be directionally energized as the line voltage increases or decreases from the predetermined value under automatic regulation as described hereinafter to so control the exciter generator 22 as to correct the excitation of the generator 10 to correct for such departure and maintain the line voltage substantially at the predetermined value.

As illustrated, the control field winding 34 is disposed to be connected through segments 36, 38, 40 and 42 of a controller 44, a voltage reference network 46 and a frequency compensating means 48 to be supplied by the line voltage, a network 50 being utilized to derive a positive sequence component of the line voltage for supplying a measure of the line voltage.

The network 50 for deriving the positive sequence component of the line voltage is disclosed and claimed in the copending application of E. L. Harder, Serial No. 560,299, filed October 25, 1944, now Patent 2,426,018, issued August 19, 1947. Briefly, the network comprises the potential transformer 52 for deriving a single phase of the three-phase line voltage having no zero-sequence voltage-component and current transformers 54 and 56 which cause line current to pass through the impedance in the network in such a manner as to produce a voltage drop substantially corresponding to the negative-sequence line-voltage, and the voltage drop thus resulting is subtracted from the single phase of the line voltage to produce substantially the positive-sequence component of the line voltage. Other embodiments of the positive-sequence component network 50 are disclosed and claimed in the aforementioned application Serial No. 560,299, and may be employed instead of the specific network 50 illustrated in the drawing.

An adjustable resistor 58 is connected in the output circuit from the network 50 for providing a voltage adjusting means. The frequency compensating means 48 may be any suitable arrangement of capacitors and inductance apparatus for accomplishing the purpose of compensating for frequency. As will be appreciated, in many cases the frequency of the line voltage will not fluctuate greatly, and it may not be necessary to utilize the compensating means 48, but instead the positive-sequence component of the line voltage from the network 50 will be supplied directly to the voltage reference network 46.

The voltage reference network 46 illustrated is disclosed in detail in the copending application Serial No. 567,256, filed December 8, 1944, now Patent 2,428,566, issued October 7, 1947, of E. L. Harder et al. and briefly comprises a non-linear impedance circuit 60 and a linear impedance circuit 62 connected to be simultaneously energized in accordance with the line voltage, and in particular, by the positive-sequence component of the line voltage. The non-linear impedance circuit 60 and the linear impedance circuit 62 are connected through insulating transformers across dry-type rectifying units 64 and 66, respectively, the output terminals of the rectifying units being connected in series circuit relation with each other through suitable series-connected resistors and series-connected smoothing reactors. The control field winding 34 of the exciter 22 is disposed to be connected through segments 36 and 38 across the direct-current series circuit connecting the rectifying units at points 65 and 67, respectively, which for the predetermined line voltage are at zero potential. The elements of the non-linear impedance circuit 60 and of the linear impedance circuit 62 have intersecting impedance characteristics and, as the line voltage fluctuates from the predetermined value, the current drawn by the circuits varies with the result that an unbalanced condition between the output of the rectifying units occurs and the control field winding 34 is energized in one or the other directions, depending upon the direction of the unbalanced condition.

The controller 44 is also provided with segments 68, 70, 72 and 74 disposed to be actuated to a circuit closing position when segments 36, 38, 40 and 42 are actuated to a circuit opening position, to connect the control field winding 34 to a manual control circuit 76 for directionally controlling the energization of the control field winding 34. In this instance, the control circuit 76 comprises two parallel circuits connected between common terminals 78 and 80, one of the parallel circuits consisting of a resistor 82 having an intermediate adjustable tap 84 and the other of the parallel circuits consisting of a resistor 86 and a pair of opposed rectifiers 88 and 89 of the dry type such as copper oxide rectifiers, the rectifiers being in parallel circuit relation with the resistor 86 with the fixed tap 90 therebetween. The common terminals or taps 78 and 80 are disposed to be connected by segments 72 and 74, respectively, across the output of the exciter generator 22 when the control field winding 34 is connected through segments 68 and 70 to the fixed tap 90 and the adjustable tap 84, respectively.

For the purpose of better understanding the operation of the manual control as will be described hereinafter, the dry type rectifiers 88 and 89 may be considered as batteries in that the forward potential drop across each of the units is substantially constant when the current flow therethrough changes, and each of the rectifiers may be considered as a substantially constant potential device when the connections are such that the current flows therethrough. It is to be noted that with the manual control circuit connected across the exciter generator 22, that only one of the rectifiers 88 and 89 is active in permitting the flow of current therethrough depending upon the polarity of the exciter generator 22, the inactive rectifier functioning as an infinite resistance or open circuit that does not in any way disturb or interfere with the operation of the manual control circuit for that particular polarity of the exciter generator 22.

In operation, with the controller 44 in the position illustrated, and assuming that the generator 10 and series tuned exciter generator 22 are being driven by some suitable means (not shown) for supplying power at a constant voltage to a load (not shown) and that the polarity of the exciter generator 22 is as illustrated, the windings 30 and 32 of the exciter generator 22 are sufficient for normally maintaining the excitation of the generator 10 to maintain substantially constant voltage across the line conductors 16, 18 and 20. Under the constant voltage conditions of the line, the positive-sequence network 50 functions to deliver a positive-sequence component of the generator voltage to the frequency compensating means 48 and from thence to the network 46.

The non-linear impedance circuit 60 and the linear impedance circuit 62 are so selected that when the positive-sequence component of the predetermined line voltage is impressed upon the network 46, the circuits 60 and 62 have intersecting impedance characteristics and the voltages across rectifying units 64 and 66 and at the points 65 and 67 are equal and so balanced that a voltage drop does not appear across the control field winding 34.

If the line voltage should increase from the predetermined value, then the positive-sequence component delivered to the network 46 is increased, with the result that the non-linear impedance circuit 60 draws more current than the linear impedance circuit 62 and the output voltages across the rectifying units 64 and 66 are unbalanced. With such an unbalanced condition, the larger potential across the rectifying unit 64 effects a voltage drop across the control field winding 34 in a direction to produce an action to oppose the excitation of the field windings 30 and 32 to decrease the output of the exciter generator 22 to decrease the excitation of the generator 10 to return the line voltage to the predetermined value.

If the change in the line voltage is a decrease, then the linear impedance circuit 62 draws more current than the non-linear impedance circuit 60 and the network is unbalanced to effect a voltage drop across the control field winding 34 in a direction to produce an action to aid the field windings 30 and 32 to increase the excitation of the exciter generator 22 and thereby effect an increase in the excitation of the generator 10 to maintain the line voltage at its predetermined value.

In many industrial and commercial applications, it is required that a manual control be utilized for a part of the regulating action instead of the automatic regulating operation just described. In such case, the controller 44 is actuated to move segments 36, 38, 40 and 42 to an open circuit position to disconnect the control field winding 34 from the network 46 to actuate segments 68, 70, 72 and 74 to circuit closing position to connect the control field winding 34 to taps 84 and 90 and the manual control circuit 76 across the exciter generator 22. The adjustable tap 84 is adjusted to a predetermined position whereby the voltage drop across the section of resistor 82 connected between taps 84 and 80 equals the voltage drop across the constant potential device 88 between taps 90 and 80 when the generator 10 is operated to maintain the predetermined line voltage and consequently, with the field windings 30 and 32 supplying sufficient excitation for the exciter generator 22 to maintain line voltage, the field current in control field winding 34 is zero. Under such conditions with the polarity of the exciter generator 22 as indicated, current flows through only rectifier 88 of the opposed rectifiers as the rectifier 89 effectively blocks the flow of current.

In operation, if the voltage of exciter generator 22 tends to rise for any reason, the voltage across the section of resistor 82 connected between taps 84 and 80 also rises whereas the voltage across the rectifier 88 connected between taps 90 and 80 remains substantially constant. Under such conditions, the potential at tap 84 rises with respect to the potential at tap 90 and current flows from the tap 84 through segment 70, control field winding 34 and segment 68 to tap 90 whereby the excitation effect of winding 34 is in opposition to the excitation effect of windings 30 and 32 to reduce the voltage of the exciter generator 22 to its original value at which value, balance in the manual control circuit 76 is again restored and the current flow through the control field winding 34 is reduced to zero.

If the voltage of exciter generator 22 tends to decrease, then the potential at tap 90 is large with respect to the potential at adjustable tap 84 and the flow of current in the control field winding 34 is reversed whereby the directional effect of the energization of winding 34 aids the excitation effect on the exciter generator 22 by reason of windings 30 and 32 to increase the excitation of exciter generator 22 to its original value, to restore the balance of the control circuit 76 and thereby effect the deenergization of control field winding 34.

The foregoing operation is that encountered for a normal operation of the system with the polarity of the exciter generator 22 as indicated, and in which operation the rectifier 89 of the manual control circuit 76 has no part. However, in certain industrial applications, such as where a plurality of the generators 10 are connected in parallel, a condition is sometimes encountered wherein the polarity of the exciter generator 22 is reversed from that indicated. For example, if the generator system (not shown) which is connected in parallel with the generator 10, illustrated, should fail in such a manner as to drive its excitation very high, a high voltage is encountered across load conductors 16, 18 and 20.

Assuming that the controller 44 is in the position illustrated for automatic regulation, it is apparent that the network 46 is responsive to variations from a given condition on the load circuit, and that the resulting unbalance between the output voltages across the rectifying units 64 and 66 of the network 46 caused by the high voltage condition referred to, is such as to effect an energization of control field winding 34 in a direction to produce an action to oppose the excitation of the field windings 30 and 32 of exciter generator 22 to decrease the excitation of generator 10. However, because of the failure of the other generator system, such reduction in the excitation of generator 10 fails to correct the high-voltage condition on the load conductors 16, 18 and 20, and the automatic network 46 continues to so effect the energization of control field winding 34 that the output of the exciter generator 22 actually reverses polarity and, at the same time, the excitation of field winding 14 passes through zero and becomes of opposite polarity. Under such conditions, it is quite apparent that the generator 10 may slip a pole relative to the generator (not shown) with which it is connected in parallel.

As long as the system is connected on automatic regulation, the network 46 continues to be responsive to the high-voltage condition on conductors 16, 18 and 20 to cause a flow of current in the control field winding 34 to normally produce an action to oppose the excitation of field windings 30 and 32 for the polarity shown. However, since the polarity of the exciter generator 22 has been reversed, the resulting excitation of control field winding 34 actually produces an action to aid the field windings 30 and 32 to increase the output of the exciter generator 22 and so increase the excitation of the generator 10 as to effect a rise in the generator voltage to its electrical ceiling.

When the condition just described arises, it can be quickly corrected by operating the controller 44 to disconnect the network 46 from the control field winding 34 and to connect the manual control circuit 76 in circuit between the exciter generator 22 and the control field winding 34. Assuming that the controller 44 is not operated until after the polarity of the exciter generator 22 is reversed from that shown, the current flow through the manual control circuit 76 is then reversed flowing from terminal 80 to terminal 78 with the rectifier 89 active in the circuit and the opposed rectifier 88 functioning to block the flow of current therethrough. Thus without the rectifier 89 connected in the circuit as illustrated, the manual control circuit 76 would be inoperative under the condition described to control the operation of the exciter generator 22 and consequently the excitation of the generator 10.

With the polarity of the exciter generator 22 reversed from the polarity illustrated and the manual control circuit 76 connected as described, it is seen that the potential at the adjustable tap 84 is more negative than the potential at the fixed tap 90 with the result that current flows from the rectifier 89 through segment 68, control field winding 34 and segment 70 to the adjustable tap 84 in a direction to normally boost the excitation of exciter generator 22 under normal polarity conditions. However, as the polarity of the exciter generator 22 is reversed and the excitation of the windings 30 and 32 is reversed, such excitation effect of the control field winding 34 actually produces an action to oppose the effect of the windings 30 and 32 to effect a decrease in the output of the exciter generator 22 and thereby so decrease the excitation of generator 10 as to effectively lower its voltage from its electrical ceiling. By adjusting the tap 84 in a direction toward the common terminal 78, the potential at tap 84 becomes more negative with respect to the potential at tap 90, so that the current flow through control field winding 34 can be quickly controlled to regulate the exciter generator 22 to supply only sufficient excitation of the generator 10 as to maintain the output therefrom at a predetermined regulated value.

The regulating system should not again be connected for automatic regulation until the generator 10 is disconnected from the parallel circuit relation with the other generators, and this operation can be performed substantially simultaneously with the operation of controller 44 at the time of connecting the manual control circuit 76 in circuit with the exciter generator 22 and control field winding 34.

During the course of the initial reversal of polarity of the exciter generator 22, it is to be noted that the excitation of generator 10 also passes through zero and also reverses. If the manual control circuit 76 has been operated to control the excitation of generator 10 to lower its output from the electrical ceiling to a predetermined normal regulated generator voltage, then when the controller 44 is again operated to disconnect the manual control circuit 76 and connect the system for automatic regulation, the network 46 should function to maintain the predetermined regulated generator voltage.

However, it is to be noted that the exciter generator 22 is still of reversed polarity so that if the output of generator 10 is above its regulated value, the network 46 functions to effect a flow of current in the control field winding 34 in a direction to produce an action to normally oppose the excitation of windings 30 and 32 but which actually aids the excitation of windings 30 and 32 when the polarity of the exciter generator is reversed and if permitted to thus operate, it very quickly so excites the generator 10 as to drive it to its electrical ceiling. Therefore, before the system is changed from manual control to automatic control, the tap 84 should be so adjusted as to maintain the output of generator 10 slightly below the predetermined regulated generator voltage, so that when the system is connected for automatic regulation the nework 46 responds to such output to effect a flow of current in the control field winding 34 in a direction to produce an action to normally aid the excitation of windings 30 and 32 under normal polarity conditions for the exciter 22.

As the polarity of exciter generator 22 is still reversed, the excitation of control field winding 34 just described actually produces an action to oppose the effect of windings 30 and 32 and continues to oppose them until the excitation of the exciter generator 22 passes through zero and the polarity of generator 22 returns to normal polarity, as indicated, after which the excitation of winding 34 produces an action to aid the windings 30 and 32 to so excite the exciter generator 22 that its output is sufficient to provide normal excitation for the generator 10. As the output of the generator 10 approaches its normal regulated value, having passed through zero with the change in polarity of the exciter generator 22, the network 46 functions to decrease the current flow through the control field winding 34 until it is zero at the normal regulated value of output for the generator 10. The network 46 then responds to changes in the output of generator 10 to automatically control the excitation of the exciter generator 22 to maintain the normal regulated output of the generator 10, as described hereinbefore. Where desired the generator 10 may again be synchronized and connected in parallel circuit relation with other generators (not shown) in a manner well known to the industry.

A desirable function of the manual control circuit 76 will be appreciated when the operation of the exciter generator 22 is considered without the control circuit 76 being connected to respond to the voltage of the exciter 22. For example, with the manual control circuit 76 disconnected from the exciter generator 22, if a reactive load or a short circuit is suddenly applied to the generator 10, such loads are accompanied by a transient increase in current flowing in the field winding 14 which, in turn, causes a transient increase in the current flowing in the series field winding 30 of exciter 22. If the transient field current in field windings 30 and 14 could be maintained at their initial values, steady operation of the generator 10 under the load would be obtained and the short-circuit current would be maintained at the transient value instead of reducing it to its lower synchronous value.

Under such conditions, the exciter generator 22 in effect tends to sustain the high transient value of field current regardless of the polarity of the exciter generator 22. This is evident for the transient current flowing through the series field winding 30 tends to effect an increase in the voltage output of exciter 22 to increase the excitation of the generator 10 and thereby tend to maintain the field current of the generator 10 at its transient value with the polarity of the exciter generator 22 as shown. If the manual control circuit 76 is connected across the exciter generator 22 as described hereinbefore, the increase thus resulting in the excitation of exciter 22 by reason of the transient current effects a change in the potential drop across the section of resistor 82 between taps 84 and 80 whereby current flows in the control field winding 34 to produce an action to oppose the excitation effect of windings 30 and 32 to cause a slow drift of the voltage of exciter generator 22 to its original predetermined value to effect a reduction in the voltage of generator 10. On the other hand, if the polarity of exciter generator 22 is reversed from that indicated, the increase resulting in the excitation of exciter 22 by reason of the transient current renders the potential of the tap 84 more negative than the potential of the tap 90, whereby current flows in the control field winding 34 in a direction to normally produce an action to aid the excitation of the windings 30 and 32 for normal polarity of the exciter generator 22 but since the polarity is reversed, the excitation of the winding 34 actually produces an action to oppose the excitation of windings 30 and 32 to again cause a slow drift of the voltage of exciter generator 22 to its original predetermined value. The operation of the manual control circuit 76 just described is of sufficient duration to permit short circuits on the line conductors 16, 18 and 20 for a sufficiently sustained period that circuit breaker (not shown) coordination can be obtained. At the same time that the action of the transient current is taking place, there is also a change in the voltage across the generator 10 and as will be apparent, the normal regulating action of the manual control circuit 76 is also of such duration that a manual adjustment of the circuit 76 can be had to correct the voltage before the change from transient to synchronous voltage can be corrected automatically.

The manual control circuit 76 utilized in this invention has an excellent settling ability for good stability, as evidenced by the fact that when a heavy load is applied to the line conductors and then later removed while the manual control circuit is connected to control the excitation of the control field winding 34, the voltage of the generator 10 is returned to substantially its original value. Further, as the manual control circuit 76 automatically provides a relatively small energization for the control field winding 34 for changes in the exciter voltage but a large forcing action when the adjustable tap 84 is moved beyond the usual setting range, it is found that a very fast restoration of voltage can be obtained with the manual control. The fact that the manual control circuit 76 also functions regardless of the polarity of the exciter generator 22 to control the output thereof to maintain a normal regulated voltage on the generator 10 is a distinct advantage in regulating systems of the type described.

We claim as our invention:

1. In a regulating system for a dynamo-electric machine, in combination, an exciter for supplying the field excitation of the dynamo-electric machine, a pair of circuits disposed to be connected in parallel circuit relation across the exciter, one of the parallel circuits comprising a resistor having an adjustable tap, the other of the parallel circuits comprising a resistor and a pair of parallel connected but opposed dry type rectifiers connected in series circuit relation therewith with a fixed tap therebetween, and a control field winding for the exciter disposed to be connected to the adjustable tap and the fixed tap to be directionally energized in accordance with the potential at the adjustable and fixed taps.

2. In a regulating system for a dynamo-electric machine disposed to supply a load circuit, in combination, an exciter for supplying the field excitation of the dynamo-electric machine, a control field winding for the exciter disposed to be directionally energized to control the excitation and polarity of the exciter, a manual control circuit disposed to be supplied by the exciter and connected to the control field winding, the manual control circuit including a pair of opposed dry type rectifiers connected in parallel circuit relation whereby the control circuit is effective when the polarity of the exciter is reversed to control the directional energization of the control field winding, and means disposed for operation to connect the manual control circuit to the exciter and control field winding.

3. In a regulating system for a dynamo-electric machine disposed to supply a load circuit, in combination, an exciter for supplying the field excitation of the dynamo-electric machine, a control field winding for the exciter disposed to be directionally energized to control the excitation and polarity of the exciter, a manual control circuit disposed to be supplied by the exciter and connected to the control field winding, the manual control circuit consisting of a pair of parallel circuits, one of the parallel circuits consisting of a resistor having an adjustable tap, the other of the parallel circuits consisting of a resistor and a pair of opposed dry type rectifiers connected in series circuit relation therewith with a fixed tap therebetween, the opposed rectifiers rendering the manual control circuit effective when the polarity of the exciter is reversed to control the directional energization of the control field winding.

4. In a regulating system for a dynamo-electric machine disposed to supply a load circuit, in combination, an exciter for supplying the field execitation of the dynamo-electric machine, a control field winding for the exciter disposed to be directionally energized to control the excitation and polarity of the exciter, a manual control circuit disposed to be supplied by the exciter and connected to the control field winding, the manual control circuit comprising a pair of circuits disposed to be connected in parallel circuit relation across the exciter, one of the parallel circuits comprising a resistor having an adjustable tap, the other of the parallel circuits comprising a resistor and a pair of parallel connected but opposed dry type rectifiers connected in series circuit relation therewith with a fixed tap therebetween, the opposed rectifiers rendering the manual control circuit effective when the polarity of the exciter is reversed to control the directional energization of the control field winding, and means disposed for operation to connect the manual control circuit to the exciter and the taps of the manual control circuit to the control field winding.

HOMER M. RUSTEBAKKE.
ALBERT W. KIMBALL.

REFERENCES CITED

The following references are of record in the file of this patent:

UNITED STATES PATENTS

| Number | Name | Date |
|---|---|---|
| 1,834,887 | Barz | Dec. 1, 1931 |
| 2,095,674 | O'Hagan | Oct. 12, 1937 |